United States Patent
Kato et al.

(10) Patent No.: US 6,196,381 B1
(45) Date of Patent: Mar. 6, 2001

(54) CONVEYOR CHAIN UNIT AND CONVEYOR CHAIN

(75) Inventors: Fukukazu Kato; Tsuyoshi Nakamura, both of Tokyo; Keiji Ohara, Musashino, all of (JP)

(73) Assignee: Yamakyu Chain Kabushiki Kaisha (JP)

( * ) Notice: Subject to any disclaimer, the term of this patent is extended or adjusted under 35 U.S.C. 154(b) by 0 days.

(21) Appl. No.: 09/354,148

(22) Filed: Jul. 16, 1999

Related U.S. Application Data

(63) Continuation-in-part of application No. 08/844,889, filed on Apr. 22, 1997, now Pat. No. 6,050,397.

(30) Foreign Application Priority Data

Nov. 29, 1996 (JP) .................................................... 8-318982

(51) Int. Cl.⁷ .................................................... B65G 17/06
(52) U.S. Cl. .......................................... 198/853; 198/851
(58) Field of Search ................................... 198/850, 851, 198/852, 853

(56) References Cited

U.S. PATENT DOCUMENTS

| | | | | |
|---|---|---|---|---|
| 5,020,659 | * | 6/1991 | Hodlewsky | 198/853 |
| 5,215,185 | * | 6/1993 | Counter et al. | 198/853 |
| 5,253,749 | * | 10/1993 | Ensch | 198/853 |
| 5,293,989 | * | 3/1994 | Garbagnati | 198/853 |
| 5,303,818 | * | 4/1994 | Gruettner et al. | 198/853 |
| 5,361,893 | * | 11/1994 | Lapeyre et al. | 198/853 |
| 5,379,883 | * | 1/1995 | Damkjaer | 198/853 |
| 5,613,597 | * | 3/1997 | Palmaer et al. | 198/853 |

* cited by examiner

Primary Examiner—Christopher P. Ellis
Assistant Examiner—Mark A. Deuble
(74) Attorney, Agent, or Firm—George T. Marcou; Kilpatrick Stockton LLP

(57) ABSTRACT

A chain unit has a central rib extending transversely and protruding portions extending from the rib to the front and rear side alternatively. The protruding portion is defined by two vertical side walls extending from the rib with the same height and a closed end portion combining the end portions of side walls. The closed end portion has an opening so as to enable the chain units to be placed in a row and column by being coupled with a connecting rod. At least two connected end portions are cylindrical shaped so as to surround the opening, and the cylindrical surface of the two closed end portions engages with a tooth of the sprocket which enters between the side walls. At least two corresponding recesses are formed in the lower surface of the rib for providing enough space to accept the tooth of the sprocket. The bottom of the chain unit has a circular arc surface extending from the rib towards the front and rear sides. A flat surface at both ends of the protruding portions is formed such that the circular arc is in surface contact with an end bar having a predetermined radial curvature corresponding to the radium of a six teeth sprocket.

2 Claims, 6 Drawing Sheets

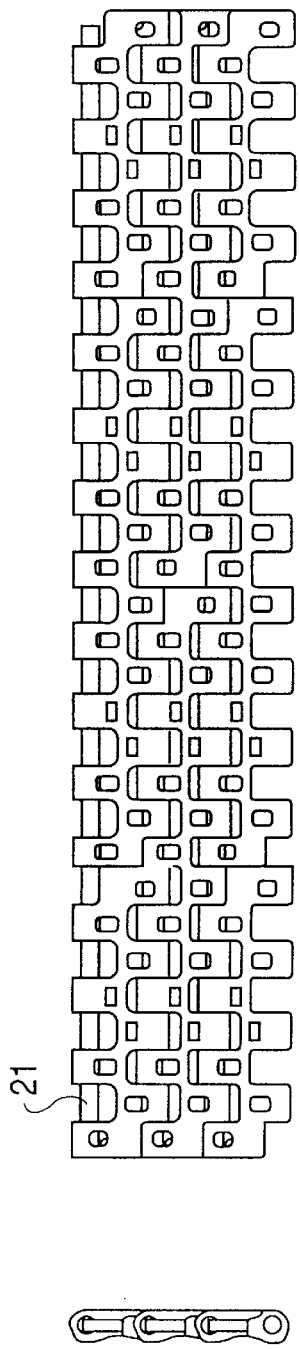
FIG. 2A
FIG. 2B
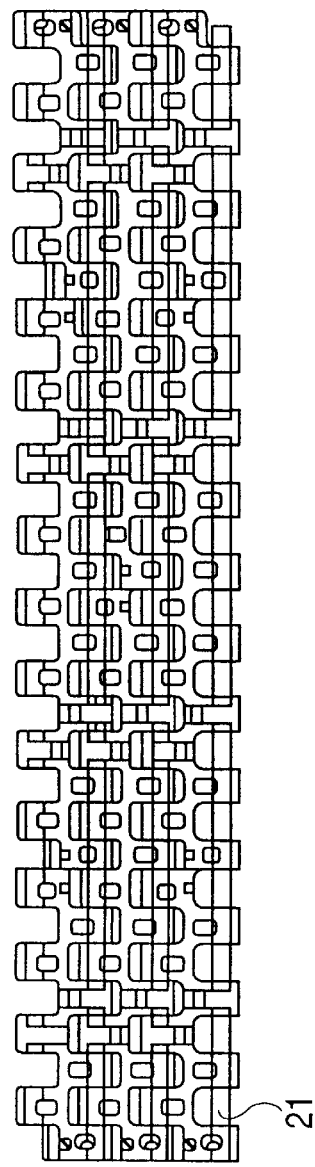
FIG. 2C
FIG. 2D

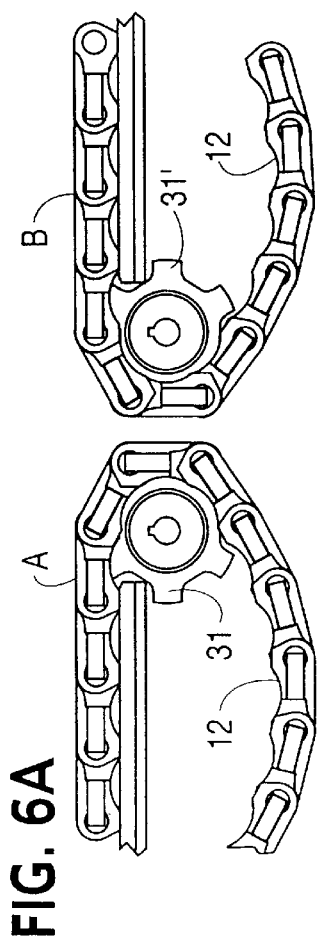
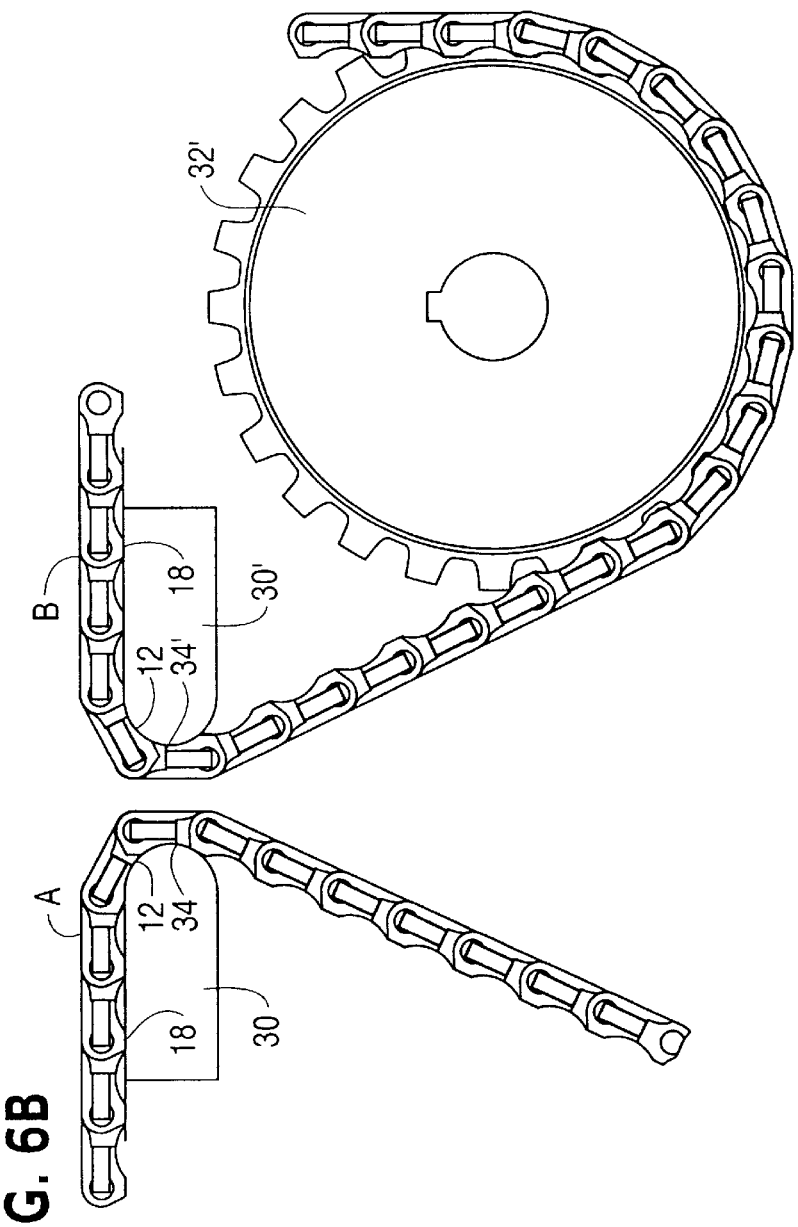
FIG. 6A
FIG. 6B

CONVEYOR CHAIN UNIT AND CONVEYOR CHAIN

This application is a continuation-in-part of application Ser. No. 08/844,889, now U.S. Pat. No. 6,050,397, filed Apr. 22, 1997.

BACKGROUND OF THE INVENTION

1. Field of the Invention

The present invention relates to a plurality of types of conveyor chain units (hereinafter simply referred to as the chain units) and a conveyor chain constructed of the plurality of types of the chain units, wherein the plurality of types of chain units are connected widthwise to form the conveyor chain which may vary in width of its conveying surface, depending upon the number and the types of the chain units used therein. More particularly, the present invention relates to two types of the chain units and a conveyor chain constructed of these two types of the chain units.

2. Description of the Prior Art

In U.S. Pat. No. 5,613,597 Palmer et al., there is disclosed a conveyor chain structured such that one or a plurality of chain units are connected in series in a widthwise direction. Each of the chain units has protruding open end portions alternately extending in a longitudinal direction from a central rib at a fixed pattern. Then, the chain units arranged in series are connected to each other by a rod extending in a widthwise direction with passing through the protruding open end portion so as to define a width of the conveyor chain. Further, the chain units are serially connected in a longitudinal direction with the chain rod extending to the protruding open end portion, so that a continuous conveyor chain belting is constructed.

The length which can be conveyed by the conveyor chain is limited by its own weight the strength of the conveyor chain itself and the frictional resistance due to the weight of the conveyed articles. The method of conveying an article can be divided into two ways comprising a side transfer in which a plurality of independent conveyor chains are installed partly adjacent to each other and a continuous transfer in which a plurality of independent conveyor chains are installed in nose-to-nose manner to each other.

FIG. 4 shows a state of the latter connecting method as seen from a lateral direction. In FIG. 4, conveyor chains A and B are independently driven by respective sprockets C and D, and in this embodiment, teeth TA and TB provided in the respective sprockets C and D commonly have a large number of teeth.

As is apparent from the drawing, it is impossible to completely remove a gap between the conveyor chains A and B. Further, the conveyor chain moves downward along the sprocket, whereby a recess generated between the conveyors A and B impedes a smooth transfer of the article between the conveyor chains.

One method for solving the problem is to provide a plate for preventing the recess between two conveyor chains in a portion having a height substantially the same height as that of the chain conveying surface. In U.S. Pat. No. 5,613,597 Palmer et al., there is further disclosed an improved chain unit in which the conveying surface of the chain unit is curved, whereby a surface of a portion of the conveyor chain engaging with the sprocket and folded back forms a substantially circular shape as seen from a lateral direction. Accordingly, a difference in level between the conveyor chains can be prevented by arranging the plate significantly close to the conveyor chain so as to make it possible to move and transfer the conveyed articles on the plate. However, in the case that a diameter of the sprocket is large, since it is necessary to make a length of the plate in the transfer direction relatively large, there is generated a problem that it is hard to smoothly transfer the article due to a friction between the plate surface and the article. Further, at a time of finishing the transfer operation, or discontinuing the transfer operation, the article is left on the plate and it is necessary to remove the article from the plate by a manual operation.

In order to solve such hung-up problem, for example, a radius R of the sprocket is made small and the plate is used as rarely as possible or an interlinking width thereof is made small if the plate is used. However, in order to reduce the radium, it is necessary to narrow the interval between the adjacent teeth or make a size of the tooth itself small. In the case of narrowing the interval between the teeth, it is necessary to make a longitudinal pitch of the conveyor chain in correspondence to the interval, and it is necessary to secure a sufficient space at which the teeth of the sprocket can be inserted and engaged, in each of the chain units within the reduced pitch. However, in this case, since an amount of a plastic mold of the chain unit itself is reduced and a total strength is reduced, it is hard to sufficiently secure a strength for a wide or long continuous conveyor chain to convey articles, so that a service life of the conveyor chain is greatly affected.

On the contrary, in place of applying the space at which the tooth can be inserted into the chain unit, it is one method to make the tooth of the sprocket small, however, in this case, the strength of the sprocket itself is reduced and the service life thereof is deteriorated.

Then, in order to maintain the interval between the adjacent teeth of the sprocket as far as possible while reducing the diameter of the sprocket, it has been considered as one means that a number of the teeth of the sprocket is reduced at the same time. However, in this case, the following problem is generated.

FIG. 5 is a graph which shows a speed fluctuation rate at which the conveyor chain performs in correspondence to a difference of the number of the teeth of the sprocket having the same radius. When the number of the teeth is increased, it is possible to perform at a relatively continuous speed having a little change, however, the speed fluctuation rate exponentially becomes high. In this embodiment, in the case of the number of the teeth is 24, the speed fluctuation rate is 0.8%, however, the speed fluctuation rate when the minimum number of the teeth is 6 is 13%. Accordingly, when using the sprocket having a small number of teeth, a discontinuous knocking speed with a large fluctuation occurs, so that it is hard to smoothly convey a commodity. As a result, the commodity itself is broken or a load is increased due to a vibration applied to the conveyor chain, so that the service life of the conveyor chain is deteriorated.

Accordingly, an object of the present invention is to provide a chain unit in which an interconnection plate is not required or a width of the interconnection plate is significantly reduced if it is used, a transfer of an article to be transferred between opposed conveyor chains is made easy, and a fluctuation rate of a performance speed can be made small.

Further, another object of the present invention is to provide an improved chain unit in which a high accuracy can be secured while providing a sufficient space at which teeth of a sprocket can be engaged, even at a reduced pitch.

In addition, the other object of the present invention is to provide an improved chain unit which can be easily assembled with a high interconnection strength and without depending upon a direction of a mutual combination in comparison with a conventional chain unit which can construct a conveyor chain having a desired width by connecting in a zigzag manner.

SUMMARY OF THE INVENTION

A chain unit in accordance with the present invention has a rib extending in a longitudinal direction at a central portion, and a protruding portion extending in a direction mutually opposing to the rib at a substantially right angle and in an alternative manner. A lower surface of the chain unit is structured in the case of being seen from a longitudinal direction of the rib such that a circular arc surface is formed from the rib toward the protruding portions in both sides and a flat portion is formed at both ends of the protruding portion. Further, a curvature of the circular arc is set such as to be in surface contact with an end bar having a predetermined radial curvature.

Further, the rib is suspended to the lower surface formed in a circular arc shape from the upper conveying surface of the conveyor chain unit, whereby a strength thereof is increased. Still further, since the protruding closed end portion is constituted by two side walls perpendicularly extending from the suspended rib in parallel to each other and connected at the end thereof, a total strength of the chain unit is further increased. A connection rod opening portion to which a connection rod can be inserted in parallel to the rib is formed on the side wall, thereby connecting the longitudinally connected chain units.

Further, a recess portion cut toward a direction of the lower surface is formed at a position between two side walls forming the protruding portion in a part of the rib suspended from the conveying surface of the conveyor chain unit. The recess portion provides a space at which the teeth of the sprocket enters from the lower surface of the chain unit. An end portion of the protruding portion corresponding to the recess portion is structured such that a cylinder formed in a circular shape so as to surround the connection rod opening is integrally provided on each of a pair of side walls so that an axis thereof becomes in parallel to the rib. Since a surface of the cylinder becomes a surface brought into contact with the teeth of the sprocket entering into the recess portion of the rib, it can transfer the assembled conveyor chain while being protected so that the teeth is not directly brought into contact with the connection rod. Further, in the case that the sprocket rotates in an opposite direction, a contact between the connection rod and the teeth can be avoided in the same manner by being brought into contact with the surface of the cylinder of the protruding portion formed in the connected adjacent chain unit, so that the transfer in the opposite direction can be performed.

BRIEF DESCRIPTION OF THE DRAWINGS

FIG. 2A is a plan view of the conveyor chain of the present invention, wherein a plurality of the chain units shown in FIG. 1A are connected widthwise with each other to form the conveyor chain;

FIG. 2B is a side view of the conveyor chain shown in FIG. 2A, looking in the direction of the arrow of FIG. 2A;

FIG. 2C is a bottom view of the conveyor chain shown in FIG. 2A;

FIG. 2D is a side view of the conveyor chain shown in FIG. 2A;

FIG. 6A is a side elevational view which shows a state that two independent conveyor chains A and B are installed in a manner nose-to-nose to each other at end and driven by independent sprockets so as to be returned back;

FIG. 6B is a side elevational view which shows a state that two independent conveyor chains A and B are adjacent to each other at a front end, returned back by independent bars and driven by sprockets disposed apart therefrom.

DESCRIPTION OF THE PREFERRED EMBODIMENTS

Hereinbelow, an embodiment of a conveyor chain unit (hereinafter simply referred to as the chain unit) of the present invention and an embodiment of a conveyor chain constructed of a plurality of these chain units, which are connected widthwise with each other to form the conveyor chain, will be described in detail with reference to the accompanying drawings.

Figure 1D:
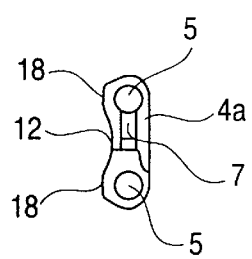
FIG. 1D is a side view of the conveyor chain unit shown in FIG. 1A.
Figure 1A:
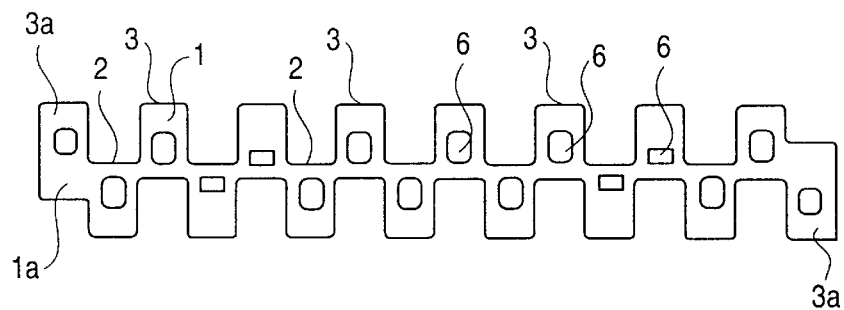
FIG. 1A is a plan view of the conveyor chain unit of the present invention.
Figure 1B:
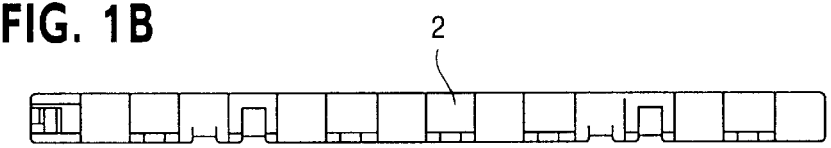
FIG. 1B is a side view of the conveyor chain unit shown in FIG. 1A looking in the direction of the arrow of FIG. 1A.
Figure 1C:
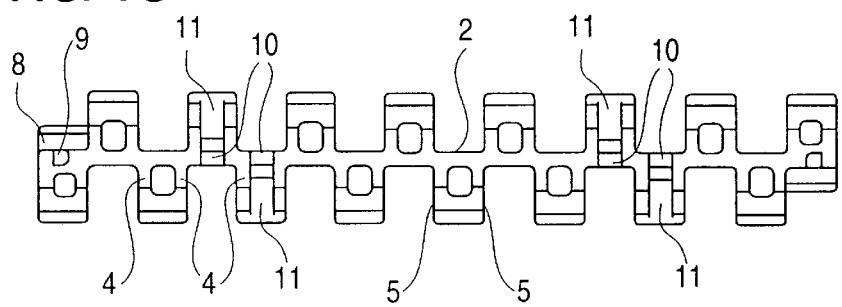
FIG. 1C is a bottom view of the conveyor chain unit shown in FIG. 1A.

FIGS. 1A, 1B and 1C show an embodiment of the chain unit of the present invention. Of these drawings, FIG. 1A shows a conveying surface 1 of the chain unit.

As viewed in FIG. 1A, the chain unit of the present invention includes projections protruding from the centered rib 2 having conveyor surface 1, which makes it possible for the chain units to be connected with each other and to form a conveyor chain provided with a desired width.

The chain unit of the present invention is provided with a central straight rib portion 2 from which the same even number of projections 3 each with a predetermined width extend in opposite directions perpendicular to a longitudinal axis of the rib portion 2. These projections 3 are spaced apart from each other at equal intervals while staggered along the rib portion 2, as shown in FIG. 1A.

The chain unit of the present invention having the above construction is improved as follows.

Each of a pair of side wall portions 4, which form the projection 3, is provided with a rod opening 5 for passing therethrough a connecting rod 21 (shown in FIG. 2A and 2B) extending in parallel to the longitudinal axis of the rib portion 2. Through such connecting rod 21 the chain units of the present invention are connected with each other.

Although the conveying surface 1 is generally flat, it is also possible for the conveying surface 1 to assume any other shape depending upon its application. For example, the conveying surface 1 may be provided with at least one opening assuming a desired shape. Further, the conveying surface 1 may be provided with any desired accessory, for example such as rib-like or button-like members, pushing members, side-guide members, magnet plates, rubber segments and like accessories, depending upon articles to be conveyed thereon.

Of the projections 3, each of outmost ones 3a, which are disposed in opposite outer side end portions of the chain unit, has its conveying surface 1a connected with the side wall portion 4 of adjacent one of the projections 3 disposed in the opposite side with respect to the rib portion 2, so as to minimize a clearance appearing in the connections in the conveying surface 1a in the side end portion of the conveyor chain when a plurality of the chain units are connected with each other, as shown in FIG. 2A.

The projection 3 is provided with a groove 7 and the rod opening 5 extending in a direction perpendicular to the groove 7, wherein the groove 7 receives a plug (shown in FIG. 3) in a manner such that the plug is completely embedded in the groove 7 in the outer side end surface of the chain unit. The plug retains the connecting rod 21 and is fixed in the through-hold 5.

The number of types of the chain units are two, one of which is a first chain unit with a basic width, and the other a second chain unit with half the basic width of the first chain unit, the number of the projections of the second chain unit being half the number of the projections of the first chain unit, wherein a plurality of the first and the second chain units are connected widthwise with each other to form a conveyor chain with a desired width equal to an integer multiple of a width of the second chain unit.

On the other hand, in the bottom of the chain unit, a concave portion 10 is provided in the rib portion 2 surrounded by the side wall portions 4 of the projections 3. Each of the projections 3 has its portion, which corresponds to the concave portion 10 of the rib portion 2, formed into a cylinder portion through which the connecting rod 21 passes, whereby a driving sprocket for driving the conveyor chain enters the concave portion 10 of the rib portion 2 to abut against the cylinder portion 11 of the projection 3, which enables the conveyor chain to endure great drive stress and enables the same driving sprocket to rotate in the forward and the reverse direction.

Further, as shown in FIG. 1D which is a side view of the chain unit shown in FIG. 1A, the bottom surface of the chain unit is formed into a curved, i.e., circular-arc surface. This circular-arc surface, the center of which is denoted by the reference numeral 12 in FIG. 1D, extends from the rib portion 2 to each of the opposite projections 3 thereof. When the chain units are assembled into the conveyor chain, the bottom surfaces of the chain units of the conveyor chain are brought into area contact with an end bar, the radius of which is a predetermined value, which eliminates uneven wear to improve the bottom surfaces of the chain units in wear resistance.

When the conveyor chain travels in a plane, a pair of flat surface portions 18 (shown in FIG. 1D) of each of the chain units slide on a conveyor table.

As shown in FIG. 2A, a plurality of the chain units described above are connected widthwise with each other to for the conveyor chain, a plan view of which is shown in FIG. 2A. More particularly, as described in the above, since the number of types of the chain units are two, one of which is the first chain unit with the basic width and the other the second chain unit with half the basic width of the first chain unit, the number of the projections of the second chain unit is half the number of the projections of the first chain unit. Consequently, a plurality of the first and the second chain units are connected widthwise with each other to form a conveyor chain with a desired width equal to an integer multiple of a width of the second chain unit.

In the embodiment of the conveyor chain of the present invention shown in FIG. 2A, these two types of the chain units are staggered in arrangement along its traveling path to improve the conveyor chain in resistance to widthwise applied stress.

The connecting rod 21 for connecting the chain units is generally constructed of a plastic rod, a length of which depends upon the width of the conveyor chain.

The details of the plug described above are shown in FIG. 3. The plug is provided with a pair of hooks 13, 14 and a connecting portion 15 therebetween. In order to facilitate the assembling operations of the conveyor chain, the connecting portion 15 of the plug has one of its opposite ends extend beyond the hook 13 to form an extension 16. In the assembling operations of the conveyor chain, the hook 13 with the extension 16 of the plug is pushed into the through-hole 5 shown in FIG. 1D. On the other hand, the other hook 14 of the plug is fitted into a lateral groove 9 which is provided in an end portion of the rib portion 2 of the chain unit. Consequently, since the plug is hooked at its opposite hooks 13, 14 without fail, there is no fear that the plug drops out of the chain unit.

Figure 3:
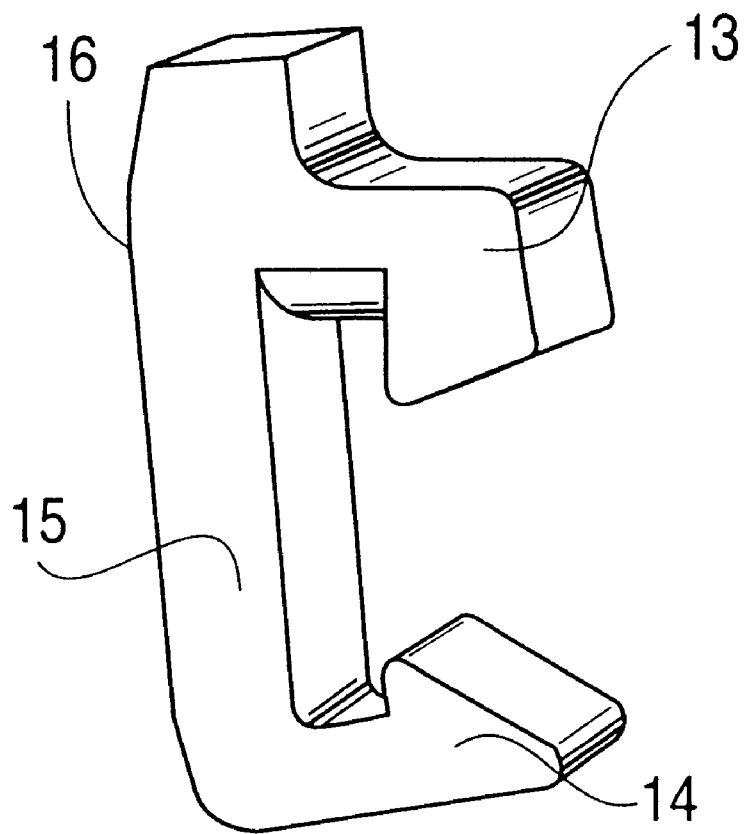
FIG. 3 is a perspective view of the plug for holding the connecting rod through which the conveyor chain units are connected with each other to form the conveyor chain of the present invention.
Figure 4:
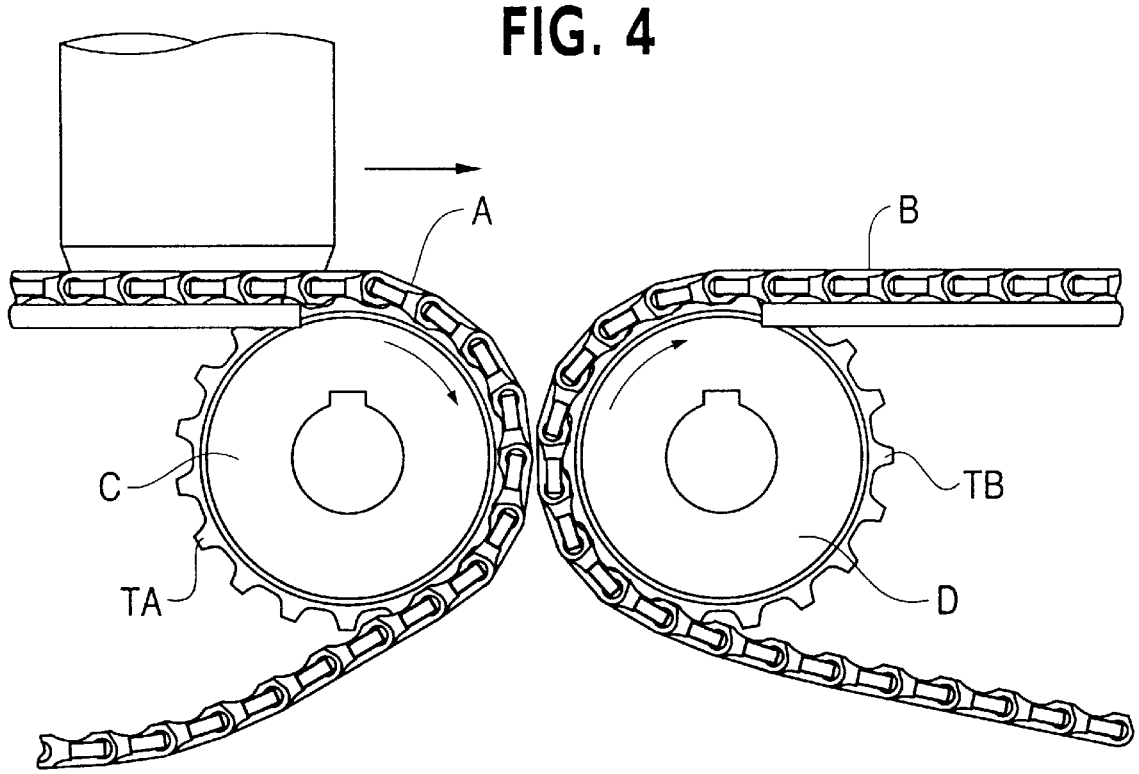
FIG. 4 is a side elevational view which shows a state that two independent conveyor chains A and B are installed in nose-to-nose manner to each other at end and are driven by independent sprockets having the generally popular number of teeth which is twelve.

Further, since the connecting portion 15 of the plug has its back curved inwardly as shown in FIG. 3, there is no fear that the plug hits against other objects such as external projections and the like to drop out of the chain unit. In addition, since it is possible for a workman to mount the plug on the side surface of the conveyor chain, the plug is excellent in workability in the assembling operations of the conveyor chain.

Figure 5:
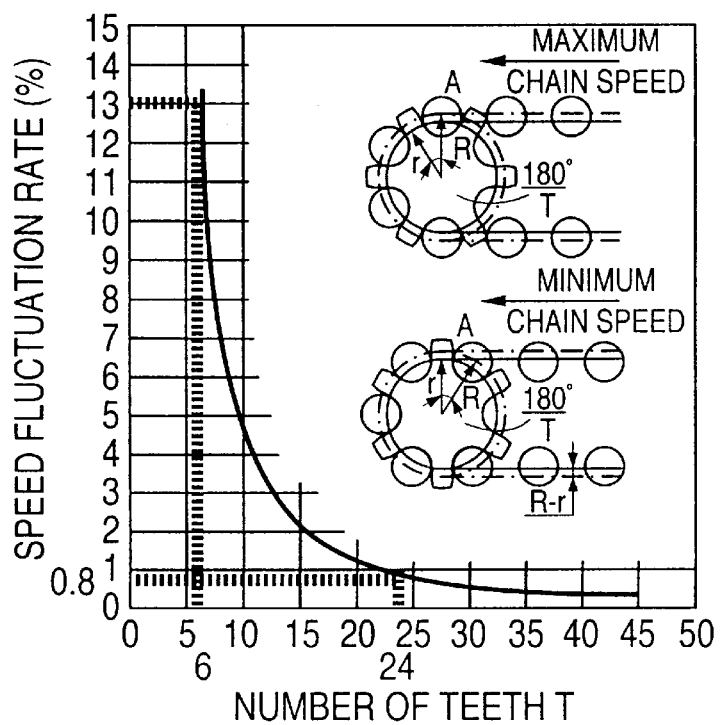
FIG. 5 is a graph which shows a number of teeth of a sprocket and a speed fluctuation rate of a conveyor chain transferred by the sprocket.

FIG. 6A is a side elevational view which shows a state that conveyor chains A and B are respectively meshed with sprockets 31 and 31' so as to be performed. In this embodiment, it is structured such that a recess portion between the conveyor chains A and B which is generated by a downward movement of a conveyor chain at a nose-to-nose end is made small by making a diameter of the sprockets 31 and 31' as small as possible, to maintain an interval between the adjacent teeth of the sprocket, a number of the teeth is reduced to possible minimum number. As is explained with reference to FIG. 5, it becomes apparent that pentagons square and/or triangle sprockets are not practical. Therefore, in accordance with this embodiment, the numbers of the teeth of the sprockets 31 and 31' are respectively set to six as possible minimum number. Accordingly, a pitch of the chain unit constructing the conveyor chain, that is, a distance between the axes through which a connection rod 21 of a protruding portion 3 extending in an opposing direction to each other with respect to the rib corresponding to an axis is defined so as to be used by the sprocket having a reduced radius and having six teeth.

To reduce the recess between conveyor chain A and B, the number of teeth of sprockets is minimized to six however the small sprocket can only adopt to a small diameter shaft which is not feasible when a wide chain is performed, and also fluctuation rate is high. Hereinafter, a description will be given of a structure for smoothly conveying an article by further reducing a change rate of the performance speed even in the case of using the conveyor chain mentioned above.

In FIG. 6B, there are shown conveyor chains A and B in which end bars 30 and 30' are provided in the protruding end portions in place of the sprockets. On front end surfaces 34 and 34' of the end bars 30 and 30', a curved surface having a constant curvature, for example, a circumferential curvature of a predetermined radius r is formed. A circular arc surface formed on a lower surface center portion 12 of each of the chain units constructing the conveyor chain is formed in such a manner as to be in surface contact with the front end surfaces 34 and 34' of the end bars 30 and 30'. On the contrary, a drive transmission for transferring the conveyor chain is performed by a sprocket 32' arranged at a space relatively having a room (the sprocket for the conveyor chain A is omitted from the illustration) at a position apart from the front end surfaces 34 and 34' of the end bars 30 and 30'. The sprocket 32' has a diameter larger than the diameter of the sprockets 31 and 31' shown in FIG. 6A. Further, a pitch between the teeth of the sprocket corresponds to a pitch of the used chain unit. Accordingly, in spite that the adjacent teeth has a relatively small pitch, the diameter of the sprocket is large, so that it is possible to engage with the chain unit by more teeth. As a result, it is possible to restrict a change of the transfer speed due to the conveyor chain to a small level.

Figure 7:
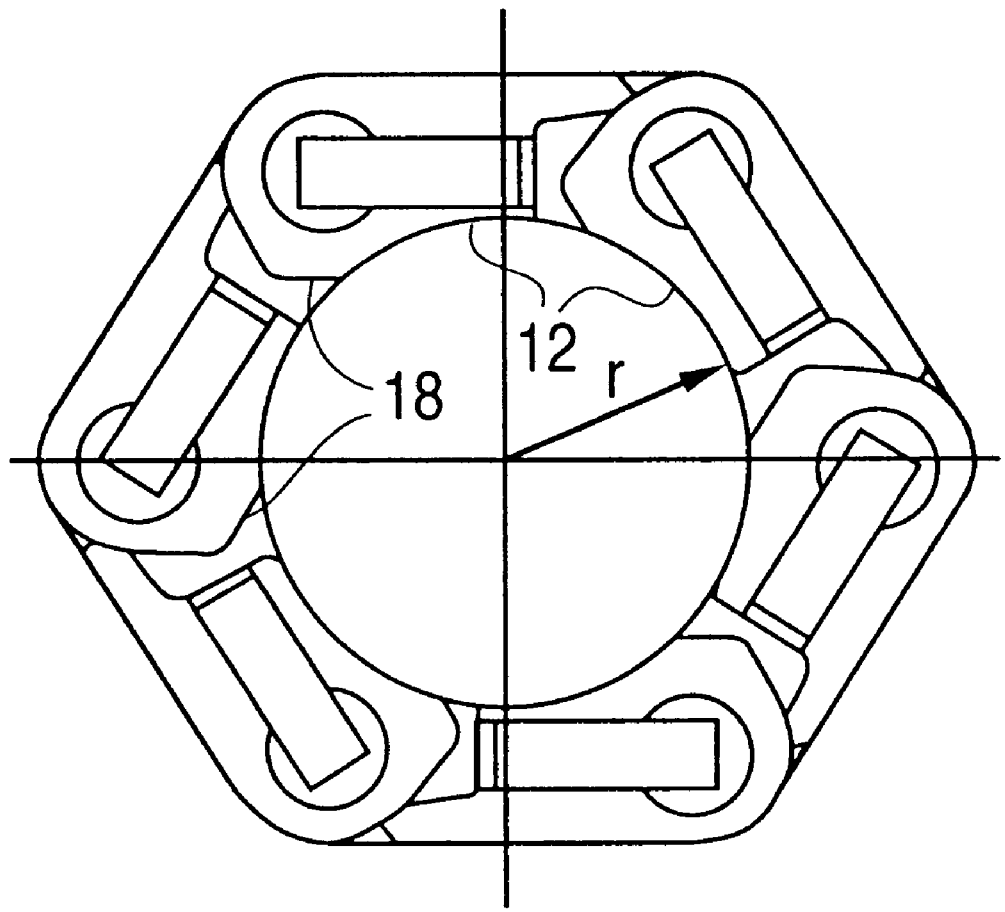
FIG. 7 is a side elevational view which shows a state that six chain units are connected and lower surfaces thereof form a circular shape having a radius r.

Next, a description will be given of a more preferable shape of the circular arc portion of the lower surface center portion 12 in the present unit. FIG. 7 is a side elevational view of a state that only six chain units are connected longitudinally. Here, it is characterized in that the curved surface portion of the lower surface center portion 12 in each of the connected chain unit forms a substantially circular shape having a radius r from the center thereof. Accordingly, the front end portions 34 and 34' of the end bars 30 and 30' for transferring the conveyor chain as shown in FIG. 6B maybe formed in such a manner as to form the curved surface having a radius r of the surface formed by these six chain units. In addition to the structure shown in FIG. 7, it can be considered to form the lower surface center portion 12 so that the curved surface of the lower surface center portion 12 forms a substantially circular shape in the case that five or four chain units are connected. However, since the radius r becomes smaller in this case, it becomes necessary to set the curvature of the lower surface center portion 12 to a large level. Accordingly, since a height of the rib in the center portion is reduced, a strength of a whole of the chain unit is reduced as a matter of course. Therefore, in order to intend to maintain the strength of the whole of the chain unit as far as possible, as in the structure shown in FIG. 7, it is preferable that the lower surface thereof has a curvature forming a continuous circular shape in the case that six chain units are connected. Then, the front end surface of the end bar may be formed in correspondence to the curved surface of the lower surface center portion 12.

As mentioned above, it is possible to make the recess formed between the adjacent conveyor chains A and B small by setting the curvature of the front end surfaces 34 and 34' of the end bars 30 and 30' to the circumferential curvature having a relatively small radius r. Further, since the curvature of the front end surfaces 34 and 34' of the end bars 30 and 30' and the curvature of the circular arc surface formed on the lower surface center portion 12 of each of the chain units constructing the conveyor chain are set to curvatures corresponding to each other in such a manner as to be in surface contact with each other, it is possible for conveyor chain to return smoothly on the front end surfaces 34 and 34' of the end bars 30 and 30'. Particularly, it is preferable that the curvature of the front end surfaces 34 and 34' of the end bars 30 and 30' substantially corresponds to the curvature of the circle formed by the lower surface center portion 12 in the case that six chain units are continuously connected. Then, since the sprocket can be arranged in a portion apart from the end bars 30 and 30' by using the end bars 30 and 30' mentioned above, it is possible to use the sprocket having a relatively large diameter and a great number of teeth. Accordingly, as is explained in FIG. 5, a smooth performance with a reduced fluctuation of speed without knocking problem can be performed.

As described above, in the present invention, only two types of the chain units, are assembled into the conveyor chain the width of which may vary, depending upon the number of the chain units used in the conveyor chain.

Even when the conveyor chain of the present invention is large in width, the conveyor chain of the present invention sufficiently withstands the drive stress imposed on its portion abutting against the driving sprocket. In addition, the conveyor chain of the present invention permits the same driving sprocket to rotate in the forward and the reverse direction.

Further, the conveyor chain of the present invention has its side and bottom surfaces improved in wear resistance without increasing the thickness of plastic used therein, but by having its chain units improved in shape according to a new technical concept. Consequently, the conveyor chain of the present invention is considerably light in weight and excellent in durability.

Further, in the conveyor chain of the present invention, there is no need of preparing various types of the chain units, which makes it possible to decrease tooling cost and stock control cost and permits a considerable reduction in the manufacturing In addition, it is possible to provide a chain unit which can form a conveyor chain capable of making a pitch small and having a large width, has a strength capable of traveling at a high speed, and stably transfers an article to be transferred from a first conveyor chain to a transfer line in the next conveyor chain.

What is claimed is:

1. A chain unit comprising a central rib extending transversely from one end to an opposite end, an equal and even number of protruding portions extending perpendicularly to the rib on a front side and an opposite rear side, said protruding portions each having an equal width and being staggered along the rib, all protruding portions and interval spaces therebetween having substantially one equal width, being characterized by:

the central rib extending from a top surface down to a bottom surface of the chain unit;

the protruding portion being defined by a pair of vertical side walls, each wall comprising an individual projection, joined at a closed end portion, said pair of vertical side walls extending perpendicularly to and integrally from the rib along the full height of the rib in parallel to each other, said closed end portion being formed between the ends of the side walls and having an opening transversely for a connecting rod passing therethrough for connecting chain units arranged in an adjacent row and in column;

at least two closed end portions on the front and rear side, each being cylindrical shaped, so as to surround the opening of the cylindrical surface of the two closed end portions being brought into contact with a tooth of the sprocket entered between the side walls of the protruding portion, and at least two corresponding recesses to the cylindrical end portions, and a recess in the lower surface of the rib for providing enough space to accept the tooth of the sprocket between the side walls therethrough, and;

the bottom of the chain unit having a circular arc surface extending from the rib toward the front and rear sides of the protruding portions and a flat surface at both ends of the protruding portions such that the circular arc surface is in surface contact with an end bar having a predetermined radial curvature corresponding to the radius of a six teeth sprocket.

2. A chain assembly comprising a plurality of first and second chain units as set forth in claim 1, characterized by:

the first chain unit having a width dimension twice that of said second chain unit and likewise having twice as many projections as the second chain unit, said first and second chain units being arranged in a brick-laid pattern the connecting rod in the openings of the protruding portions of chain units placed in an adjacent row and column such that the protruding portion projects between the protruding portions of another chain unit in the adjacent row.

* * * * *